US012748822B2

(12) United States Patent
Lin et al.

(10) Patent No.: US 12,748,822 B2
(45) Date of Patent: Sep. 29, 2026

(54) METHOD AND DEVICE FOR IMPROVING PERFORMANCE OF DATA PROCESSING MODEL, STORAGE MEDIUM AND ELECTRONIC DEVICE

(71) Applicant: JINGDONG CITY (BEIJING) DIGITS TECHNOLOGY CO., LTD., Beijing (CN)

(72) Inventors: Feng Lin, Beijing (CN); Xiaobo Wang, Beijing (CN); Zexia Yin, Beijing (CN); Junbo Zhang, Beijing (CN)

(73) Assignee: JINGDONG CITY (BEIJING) DIGITS TECHNOLOGY CO., LTD., Beijing (CN)

( * ) Notice: Subject to any disclaimer, the term of this patent is extended or adjusted under 35 U.S.C. 154(b) by 946 days.

(21) Appl. No.: 17/969,729

(22) Filed: Oct. 20, 2022

(65) Prior Publication Data

US 2023/0117088 A1 Apr. 20, 2023

(30) Foreign Application Priority Data

Oct. 20, 2021 (CN) ......................... 202111221435.5

(51) Int. Cl.
*G06F 18/2433* (2023.01)
*G06F 18/10* (2023.01)
*G06F 18/214* (2023.01)

(52) U.S. Cl.
CPC .......... *G06F 18/2433* (2023.01); *G06F 18/10* (2023.01); *G06F 18/214* (2023.01)

(58) Field of Classification Search
CPC .... G06F 18/214; G06F 18/10; G06F 18/2433; G06N 3/08
(Continued)

(56) References Cited

U.S. PATENT DOCUMENTS 10,970,313 B2 * 4/2021 Tao ........................ G06N 3/088
2012/0054184 A1 * 3/2012 Masud .................. G06F 16/285
707/E17.091
2023/0289659 A1 * 9/2023 Katoh ...................... G06N 3/09

OTHER PUBLICATIONS

Omer Gozuacik et al, "Concept Learning using one-class cassifiers for implicit drift detection in evolving data streams", Nov. 20, 2020.*

(Continued)

*Primary Examiner* — Hung T Vy
(74) *Attorney, Agent, or Firm* — Yue (Robert) Xu; Apex Attorneys at Law, LLP

(57) ABSTRACT

A method and a device for improving performance of a data processing model, a storage medium and an electronic device are provided. A piece of data in a determined test data read currently is determined as target data. Outlier detection parameters in a detection module are acquired. Detection of concept drift is performed on the data processing model based on the target data and the outlier detection parameters. A detection module is triggered to update each of the outlier detection parameters and the data processing model is retrained when concept drift is successfully detected. After the data processing model is already trained, a piece of data to be read next is determined as the target data, the updated outlier detection parameters in the detection module are acquired, and the detection is resumed until all the pieces of data in the test data stream are read.

9 Claims, 11 Drawing Sheets

(58) Field of Classification Search
USPC ............................................................ 706/45
See application file for complete search history.

(56) References Cited

OTHER PUBLICATIONS

The European Search Report issued on Feb. 20, 2023 for EP22202094.3.
Gozuaqik Omer et al: "Concept learning using one-class classifiers for implicit drift detection in evolving data streams", Artificial Intelligence Review, Springer Netherlands, NL, vol. 54, No. 5, Nov. 20, 2020 (Nov. 20, 2020), pp. 3725-3747, XP037461948,ISSN: 0269-2821, DOI: 10.1007/S10462-020-09939-X.
Kayacik Asir Furkan et al: "Real-Time Fraud Prediction on Streaming Customer-Behaviour Data",2021 International Conference on Electrical, Communication, and Computer Engineering (ICECCE), IEEE, Jun. 12, 2021 (Jun. 12, 2021), pp. 1-6, XP033964030, DOI: 10.1109/ICECCE52056.2021.9514169.
Frias-Blanco Isvani et al: "Online and Non-Parametric Drift Detection Methods Based on Hoeffding's Bounds", IEEE Transactions on Knowledge and Data Engineering, vol. 27, No. 3, Mar. 1, 2015 (Mar. 1, 2015), pp. 810-823, XP093022505, US ISSN: 1041-4347, DOI: 10.1109/TKDE.2014.2345382.
Ruggieri Eric et al: "An exact approach to Bayesian sequential change point detection", Computational Statistics and Data Analysis, North-Holland, Amsterdam, NL, vol. 97, Dec. 2, 2015 (Dec. 2, 2015), pp. 71-86, XP029384395, ISSN: 0167-9473, DOI: 10.1016/J.CSDA.2015.11.010.

* cited by examiner

METHOD AND DEVICE FOR IMPROVING PERFORMANCE OF DATA PROCESSING MODEL, STORAGE MEDIUM AND ELECTRONIC DEVICE

The present application claims the priority to Chinese patent application No. 202111221435.5, titled "METHOD AND DEVICE FOR IMPROVING PERFORMANCE OF DATA PROCESSING MODEL, STORAGE MEDIUM AND ELECTRONIC DEVICE", filed on Oct. 20, 2021 with the China National Intellectual Property Administration, incorporated herein by reference in its entirety.

FIELD

The present disclosure relates to the technical field of data processing, especially to a method and a device for improving performance of a data processing model, a storage medium and an electronic device.

BACKGROUND

With their development, neural networks are used in increasing industries to construct data processing models for processing data subsequently, so as to implement data classification, data prediction and the like.

Generally, a data processing model is trained successfully based on known data, and then processes new unknown data. However, in many scenarios such as finance and transportation where dynamic streaming data is the main focus, distribution of a data stream and information reflected by the data stream changes with time and environment, which is called concept drift. The occurrence of concept drift may affect accuracy of the data processing model in data processing and thus reduces the performance of the data processing model.

SUMMARY

In view of this, a method and a device for improving performance of a data processing model, a storage medium and an electronic device are provided according to the present disclosure. A data processing model in which concept drift is detected is retrained, so as to reduce the influence of concept drift on the data processing model and thus improve performance of the data processing model.

In order to reduce the influence of concept drift on a data processing model and improve performance of the data processing model, the following technical solutions are provided according to embodiments of the present disclosure.

A method for improving performance of a data processing model is provided according to a first aspect of the present disclosure. The method includes: determining a test data stream for the data processing model to read all pieces of data in the test data stream one by one, and determining a piece of data read currently as target data; acquiring outlier detection parameters pre-generated in a detection module; performing detection of concept drift on the data processing model based on the target data and the outlier detection parameters; triggering, in response to detecting that concept drift occurs in the data processing model, the detection module to update each of the outlier detection parameters, and retraining the data processing model; and after the data processing model is already trained, determining a piece of data to be read next as the target data, acquiring the updated outlier detection parameters in the detection module, and resuming the detection of concept drift on the data processing model based on the target data and the updated outlier detection parameters, until all the pieces of data in the test data stream are read.

In an embodiment, generation of outlier detection parameters by the detection module includes: determining a training dataset corresponding to the data processing model, and determining a detection dataset from the training dataset; processing the detection dataset to obtain an upper boundary and a lower boundary of the detection dataset; acquiring a minimum outlier ratio of the detection dataset based on the upper boundary and the lower boundary; and determining the upper boundary, the lower boundary and the minimum outlier ratio as the outlier detection parameters.

In an embodiment, the performing detection of concept drift on the data processing model based on the target data and the outlier detection parameters includes: storing the target data into a received dataset, and acquiring the number of pieces of data in the received dataset; determining the number of outliers in the received dataset based on the upper boundary and the lower boundary among the outlier detection parameters; and performing the detection of concept drift on the data processing model based on the minimum outlier ratio among the outlier detection parameters, the number of pieces of data in the received dataset and the number of outliers in the received dataset.

In an embodiment, the performing detection of concept drift on the data processing model based on the target data and the outlier detection parameters includes: determining the upper boundary and the lower boundary among the outlier detection parameters, and determining the upper boundary, the lower boundary and a preset drift confidence level as drift operation parameters; storing the target data in a detection set, and classifying data in the detection set to obtain a first detection interval, a second detection interval, a third detection interval and a fourth detection interval; invoking a predefined interval statistical algorithm to process the first detection interval to obtain a statistical parameter group of the first detection interval, process the second detection interval to obtain a statistical parameter group of the second detection interval, process the third detection interval to obtain a statistical parameter group of the third detection interval, and process the fourth detection interval to obtain a statistical parameter group of the fourth detection interval; processing the statistical parameter group of the first detection interval, the statistical parameter group of the second detection interval and the drift operation parameters, to obtain a first drift boundary value and a first drift detection value; processing the statistical parameter group of the third detection interval, the statistical parameter group of the fourth detection interval and the drift operation parameters, to obtain a second drift boundary value and a second drift detection value; and performing the detection of concept drift on the data processing model based on the first drift boundary value, the first drift detection value, the second drift boundary value and the second drift detection value.

In an embodiment, after the performing the detection of concept drift on the data processing model, the method further includes: determining the upper boundary and the lower boundary among the outlier detection parameters, and determining the upper boundary, the lower boundary and a predefined warning confidence level as warning operation parameters; processing the statistical parameter group of the first detection interval, the statistical parameter group of the second detection interval and the warning operation parameters, to obtain a first warning boundary value and a first warning detection value; processing the statistical parameter group of the third detection interval, the statistical parameter group of the fourth detection interval and the warning operation parameters, to obtain a second warning boundary value and a second warning detection value; and determining, based on the first warning boundary value, the first warning detection value, the second warning boundary value and the second warning detection value, whether the data processing model meets a warning condition, and sending warning information if it is determined that the data processing model meets the warning condition.

In an embodiment, the classifying data in the detection set to obtain a first detection interval, a second detection interval, a third detection interval and a fourth detection interval includes: determining first segmentation data and second segmentation data in the detection set; determining data in the detection set that is stored before the first segmentation data, and the first segmentation data as the first detection interval; determining data in the detection set that is stored after the first segmentation data, and the first segmentation data as the second detection interval; determining data in the detection set that is stored before the second segmentation data, and the second segmentation data as the third detection interval; and determining data in the detection set that is stored after the second segmentation data, and the second segmentation data as the fourth detection interval.

In an embodiment, after the first detection interval, the second detection interval, the third detection interval and the fourth detection interval are obtained, the method further includes: invoking the interval statistical algorithm to process the detection set, to obtain a statistical parameter group of the detection set; acquiring a first segmentation boundary based on the statistical parameter group of the detection set and the drift operation parameters; acquiring a second segmentation boundary based on the statistical parameter group of the first detection interval and the drift operation parameters; acquiring a third segmentation boundary based on the statistical parameter group of the third detection interval and the drift operation parameters; determining, based on the first segmentation boundary, the second segmentation boundary, the statistical parameter group of the detection set, and the statistical parameter group of the first detection interval, whether to update the first segmentation data, and updating the target data to the first segmentation data in the detection set if it is determined to update the first segmentation data; and determining, based on the first segmentation boundary, the third segmentation boundary, the statistical parameter group of the detection set, and the statistical parameter group of the third detection interval, whether to update the second segmentation data, and updating the target data to the second segmentation data in the detection set if it is determined to update the second segmentation data.

A device for improving performance of a data processing model is provided according to a second aspect of the present disclosure. The device includes a reading unit, a first acquisition unit, a detecting unit, a triggering unit, and a resuming unit. The reading unit is configured to determine a test data stream for the data processing model to read all pieces of data in the test data stream one by one, and determine a piece of data read currently as target data. The first acquiring unit is configured to acquire outlier detection parameters pre-generated in a detection module. The detecting unit is configured to perform detection of concept drift on the data processing model based on the target data and the outlier detection parameters. The triggering unit is configured to trigger, in response to detecting that concept drift occurs in the data processing model, the detection module to update each of the outlier detection parameters, and retrain the data processing model. The resuming unit is configured to, after the data processing model is already trained, determine a piece of data to be read next as the target data, acquire the updated outlier detection parameters in the detection module, and resume the detection of concept drift on the data processing model based on the target data and the updated outlier detection parameters, until all the pieces of data in the test data stream are read.

In an embodiment, the device further includes a first determining unit, a first processing unit, an acquiring unit and a second determining unit. The first determining unit is configured to determine a training dataset corresponding to the data processing model, and determine a detection dataset from the training dataset. The first processing unit is configured to process the detection dataset to obtain an upper boundary and a lower boundary of the detection dataset. The acquiring unit is configured to acquire a minimum outlier ratio of the detection dataset based on the upper boundary and the lower boundary. The second determining unit is configured to determine the upper boundary, the lower boundary and the minimum outlier ratio as the outlier detection parameters.

In an embodiment, the detecting unit includes a storing subunit, a first determining subunit, and a first detecting subunit. The storing subunit is configured to store the target data into a received dataset, and acquire the number of pieces of data in the received dataset. The first determining subunit is configured to determine the number of outliers in the received dataset based on the upper boundary and the lower boundary among the outlier detection parameters. The first detecting subunit is configured to perform the detection of concept drift on the data processing model based on the minimum outlier ratio, the number of pieces of data in the received dataset and the number of outliers in the received dataset.

In an embodiment, the detecting unit includes a second determining subunit, a segmenting subunit, an invoking subunit, a first processing subunit, a second processing subunit, and a second detecting subunit. The second determining subunit is configured to determine the upper boundary and the lower boundary among the outlier detection parameters, and determine the upper boundary, the lower boundary and a preset drift confidence level as drift operation parameters. The segmenting subunit is configured to store the target data in a detection set, and classify data in the detection set to obtain a first detection interval, a second detection interval, a third detection interval and a fourth detection interval. The invoking subunit is configured to invoke a predefined interval statistical algorithm to process the first detection interval to obtain a statistical parameter group of the first detection interval, process the second detection interval to obtain a statistical parameter group of the second detection interval, process the third detection interval to obtain a statistical parameter group of the third detection interval, and process the fourth detection interval to obtain a statistical parameter group of the fourth detection interval. The first processing subunit is configured to process the statistical parameter group of the first detection interval, the statistical parameter group of the second detection interval and the drift operation parameters, to obtain a first drift boundary value and a first drift detection value. The second processing subunit is configured to process the statistical parameter group of the third detection interval, the statistical parameter group of the fourth detection interval and the drift operation parameters, to obtain a second drift boundary value and a second drift detection value. The second detecting subunit is configured to perform the detection of concept drift on the data processing model based on the first drift boundary value, the first drift detection value, the second drift boundary value and the second drift detection value.

In an embodiment, the device further includes a third determining unit, a second processing unit, a third processing unit and a fourth determining unit. The third determining unit is configured to determine the upper boundary and the lower boundary among the outlier detection parameters, and determine the upper boundary, the lower boundary and a predefined warning confidence level as warning operation parameters. The second processing unit is configured to process the statistical parameter group of the first detection interval, the statistical parameter group of the second detection interval and the warning operation parameters, to obtain a first warning boundary value and a first warning detection value. The third processing unit is configured to process the statistical parameter group of the third detection interval, the statistical parameter group of the fourth detection interval and the warning operation parameters, to obtain a second warning boundary value and a second warning detection value. The fourth determining unit is configured to determine, based on the first warning boundary value, the first warning detection value, the second warning boundary value and the second warning detection value, whether the data processing model meets a warning condition, and send warning information if it is determined that the data processing model meets the warning condition.

In an embodiment, the segmenting subunit includes a first determining module, a second determining module, a third determining module, and a fourth determining module. The first determining module is configured to determine data in the detection set that is stored before the first segmentation data, and the first segmentation data as the first detection interval. The second determining module is configured to determine data in the detection set that is stored after the first segmentation data, and the first segmentation data as the second detection interval. The third determining module is configured to determine data in the detection set that is stored before the second segmentation data, and the second segmentation data as the third detection interval. The fourth determining module is configured to determine data in the detection set that is stored after the second segmentation data, and the second segmentation data as the fourth detection interval.

In an embodiment, the device further includes an invoking unit, a second acquiring unit, a third acquiring unit, a fourth acquiring unit, a first determining unit and a second determining unit. The invoking unit is configured to invoke the interval statistical algorithm to process the detection set, so as to obtain a statistical parameter group of the detection set. The second acquiring unit is configured to acquire a first segmentation boundary based on the statistical parameter group of the detection set and the drift operation parameters. The third acquiring unit is configured to acquire a second segmentation boundary based on the statistical parameter group of the first detection interval and the drift operation parameters. The fourth acquiring unit is configured to acquire a third segmentation boundary based on the statistical parameter group of the third detection interval and the drift operation parameters. The first determining unit is configured to determine, based on the first segmentation boundary, the second segmentation boundary, the statistical parameter group of the detection set, and the statistical parameter group of the first detection interval, whether to update the first segmentation data, and update the target data to the first segmentation data in the detection set if it is determined to update the first segmentation data. The second determining unit is configured to determine, based on the first segmentation boundary, the third segmentation boundary, the statistical parameter group of the detection set, and the statistical parameter group of the third detection interval, whether to update the second segmentation data, and update the target data to the second segmentation data in the detection set if it is determined to update the second segmentation data.

A storage medium is provided according to a third aspect of the present disclosure. The storage medium stores instructions. The instructions, when being executed, control a device in which the storage medium is arranged to perform the method for improving performance of a data processing model as described above.

An electronic device is provided according to a fourth aspect of the present disclosure. The electronic device includes a memory and one or more processors. The memory stores one or more instructions. The one or more processors are configured execute the one or more instructions so as to perform the method for improving performance of a data processing model as described above.

Compared with the existing technology, the present disclosure has the following advantages. A method and a device for improving performance of a data processing model, a storage medium and an electronic device are provided according to the present disclosure. The method includes: determining a test data stream for the data processing model to read all pieces of data in the test data stream one by one, and determining a piece of data read currently as target data; acquiring outlier detection parameters pre-generated in a detection module; performing detection of concept drift on the data processing model based on the target data and the outlier detection parameters; triggering, in response to detecting that concept drift occurs in the data processing model, the detection module to update each of the outlier detection parameters, and retraining the data processing model; and after the data processing model is already trained, determining a piece of data to be read next as the target data, acquiring the updated outlier detection parameters in the detection module, and resuming the detection of concept drift on the data processing model based on the target data and the updated outlier detection parameters, until all the pieces of data in the test data stream are read. In the present disclosure, the data processing model is retrained when concept drift is successfully detected on the data processing model, to reduce the influence of concept drift on accuracy of the data processing model in data processing, thereby improving performance of the data processing model.

BRIEF DESCRIPTION OF THE DRAWINGS

In order to more clearly illustrate the technical solutions in the embodiments of the present disclosure or in the existing technology, the drawings to be used in the embodiments or the description of the existing technology are briefly introduced below. It is apparent that the drawings in the following description show only the embodiments of the present disclosure. For those ordinary skilled in the art, other drawings may also be obtained based on the provided drawings without any creative effort.

FIG. 8(*b*) is a schematic diagram illustrating an application case according to another embodiment of the present disclosure;

FIG. 8(*c*) is a schematic diagram illustrating an application case according to another embodiment of the present disclosure;

DETAILED DESCRIPTION OF EMBODIMENTS

The technical solutions in the embodiments of the present disclosure will be clearly and completely described below with reference to the drawings in the embodiments of the present disclosure. It is apparent that the described embodiments are only some rather than all the embodiments of the present disclosure. All other embodiments, obtained by those skilled in the art based on the embodiments in the present disclosure without any creative work, fall within the scope of protection of the present disclosure.

In this application, the term "including", "comprising" or any other variant thereof is intended to cover non-exclusive inclusion, so that a process, method, article or device that includes a series of elements not only includes those elements, but also includes other elements that are not clearly listed, or further includes elements inherent in such process, method, article or device. Without more restrictions, the inclusion of an element as defined by a statement "including a" does not preclude the existence of additional identical elements in the process, method, article, or device including the element.

The present disclosure is applicable to environments or configurations of various general or specialized computing devices, such as personal computers, server computers, handheld devices or portable devices, tablet devices, multiprocessor devices, or distributed computers including any of the listed devices. The method according to the embodiments of the present disclosure is applicable to a model detection system for improving performance of a model. The model detection system includes various computer terminals or intelligent service devices, and may be run on a processor or server.

Figure 1:
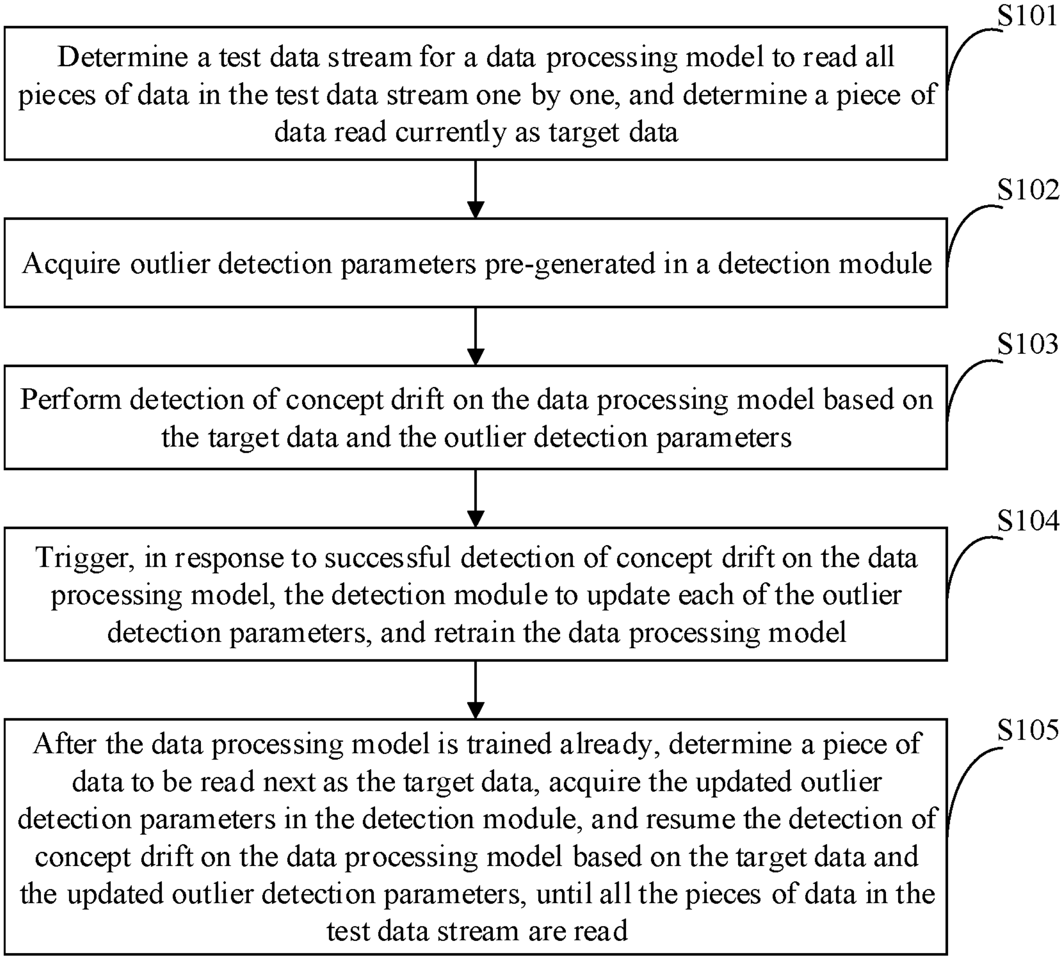
FIG. 1 is a flow chart illustrating a method for improving performance of a data processing model according to an embodiment of the present disclosure.

Reference is made to FIG. 1, which is a flow chart illustrating a method for improving performance of a data processing model according to an embodiment of the present disclosure. The method is described in detail below.

In step S101, a test data stream for a data processing model is determined to read all pieces of data in the test data stream one by one, and a piece of data read currently is determined as target data.

The test data stream is to be processed by the data processing model. The test data stream includes multiple pieces of data arranged in an orderly queue. The data processing model includes various models for processing data, such as artificial intelligence (AI) models, and models for data classification.

After the test data stream for the data processing model is determined, all pieces of data in the test data stream are acquired one by one, and the piece of data acquired currently is determined as the target data.

In step S102, outlier detection parameters pre-generated in a detection module are acquired.

The detection model generates these outlier detection parameters based on a training dataset of the data processing model and a predefined outlier detection method, for example, the box plot invented by Tukey. The outlier detection parameters include an upper boundary, a lower boundary and a minimum outlier ratio. In an embodiment, the detection module also be referred to as an upper-lower boundary estimation module.

In step S103, detection of concept drift is performed on the data processing model based on the target data and the outlier detection parameters.

Based on the target data and the outlier detection parameters, the detection of concept drift is performed on the data processing model for a Hoeffding boundary or a data outlier ratio.

In an embodiment, a concept drift detection module processes the target data and each of the outlier detection parameters by using a pre-defined concept drift detection algorithm, so as to perform the detection of concept drift on the data processing model.

In step S104, in response to detecting that concept drift occurs in the data processing model, the detection module is triggered to update each of the outlier detection parameters, and the data processing model is retrained.

In order to update each of the outlier detection parameters, the detection module generates outlier detection parameters according to a procedure for generating an outlier detection parameter, and determines the generated outlier detection parameters as updated outlier detection parameters respectively. That is, the outlier detection parameters generated here are the outlier detection parameters pre-generated in the detection module, respectively.

In order to retrain the data processing model, a training dataset of the data processing model is updated. Each piece of data acquired from the test data stream is updated as a training sample and then is stored to the training dataset with an earliest training sample in the training dataset being removed, such that the training dataset is updated. The data processing model is retrained based on the updated training dataset.

It should be noted that the capacity of a data pool for storing the training dataset is fixed. In order to reduce the cost of data storage, the training sample originally stored in the training dataset is removed while a new training sample is added to the training dataset. With the updated training dataset, the data processing model can be trained in time when concept drift occurs, so as to reduce the influence of concept drift on the data processing model in subsequent data processing, thereby improving the performance of the data processing model.

In an embodiment, in response to a failure in the detection of concept drift on the data processing model, a piece of data to be read next is determined as the target data, and the method returns to S102 until all pieces of data in the test data stream are read already. In the absence of concept drift on the data processing model, the data processing model is triggered to process the target data. In an example, the data processing model is used to perform data classification. The data processing module is triggered to perform data classification on the target data and output a data type of the target data.

In an embodiment, in consideration of simplicity of execution in the system, the outlier detection parameters for the previous target data are directly determined as outlier detection parameters for the current target data in a case that the outlier detection parameters in the detection model has not been updated. Therefore, in the absence of concept drift on the data processing model, the method returns to S103.

In step S105, after the data processing model is already trained, a piece of data to be read next is determined as the target data, and the updated outlier detection parameters in the detection module are acquired. The detection of concept drift is resumed on the data processing model based on the target data and the updated outlier detection parameters, until all pieces of data in the test data stream are read.

In an embodiment, the target data is processed based on the trained data processing model, and then the piece of data to be read next is determined as the target data.

With the method according to the embodiments of the present disclosure, a test data stream for a data processing model is determined to read all pieces of data in the test data stream one by one, and a piece of data read currently is determined as target data. Outlier detection parameters in a detection module are acquired. Detection of concept drift is performed on the data processing model based on the target data and the outlier detection parameters. In response to detecting that concept drift occurs in the data processing model, the detection module is triggered to update each of the outlier detection parameters, and the data processing model is retrained. After the data processing model is already trained, a piece of data to be read next is determined as the target data, and the updated outlier detection parameters in the detection module are acquired. The detection of concept drift is resumed on the data processing model based on the target data and the updated outlier detection parameters, until all pieces of data in the test data stream are read. In the present disclosure, the data processing model is retrained when concept drift is successfully detected on the data processing model, to reduce the influence of concept drift on the data processing model and thus improve performance of the data processing model.

Figure 2:
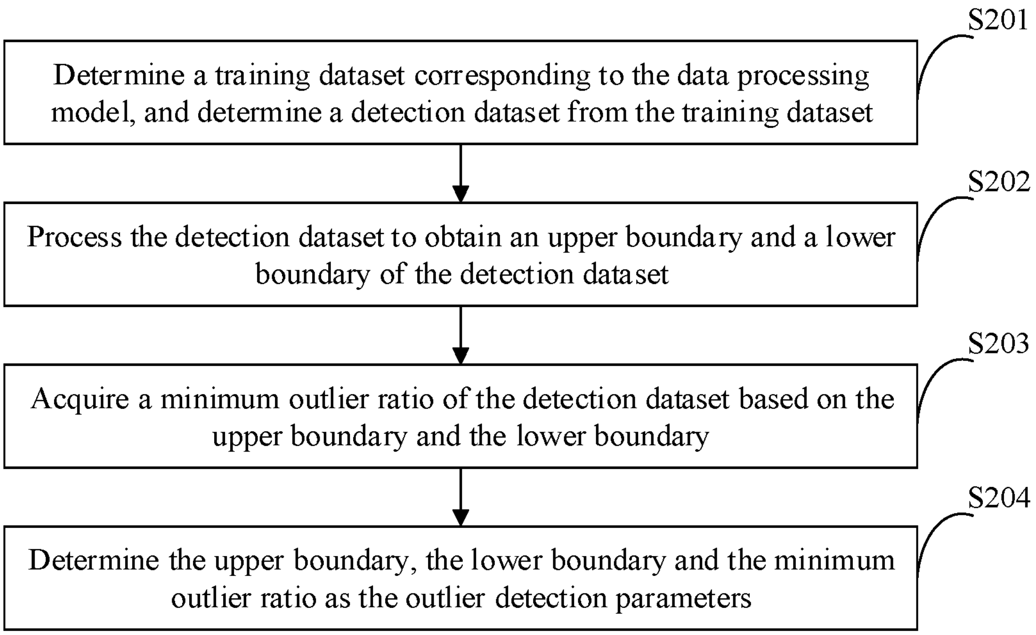
FIG. 2 is a flow chart illustrating generation of outlier detection parameters by a detection module according to an embodiment of the present disclosure.

Reference is made to FIG. 2, the generation of the outlier detection parameters by the detection module is described in detail below according to another embodiment of the present disclosure.

In step S201, the training dataset corresponding to the data processing model is determined, and a detection dataset is determined from the training dataset.

The training dataset is a set of data samples for training the data processing model, and includes multiple training samples, that is, data. The detection dataset is determined from the training dataset. The training samples in the training dataset are updatable. The training dataset is updated in response to detecting that concept drift occurs in the data processing model. Therefore, the detection dataset is determined from the updated training samples, so as to obtain the outlier detection parameters that are more in line with the current situation of the data processing model.

In order to determine the detection dataset from the training dataset, N pieces of data are selected from the training dataset to form the detection dataset. It should be noted that the latest data is selected to form the detection dataset.

In step S202, the detection dataset is processed to obtain an upper boundary and a lower boundary of the detection dataset.

The detection dataset is processed based on outlier detection, for example, the box plot. The detection dataset is processed by the box plot to obtain a first quantile and a third quantile. The first quantile is also known as the ¼ percentile, and is denoted by Q1. The third quantile is also known as the ¾ percentile, and is denoted by Q3.

The interquartile range IQR is calculated by subtracting the first quartile Q1 from the third quartile Q3, that is, $IQR=Q3-Q1$. IQR covers middlemost 50% data in data distribution of the detection dataset, and thus is robust.

The upper boundary is calculated based on the interquartile range and the third quantile by using an equation for calculating the upper boundary. The lower boundary is calculated based on the interquartile range and the first quantile by using an equation for calculating the lower boundary.

It should be noted that the equation for calculating the upper boundary is expressed as $b=Q3+1.5*IQR$, and the equation for calculating the lower boundary is expressed as $a=Q1-1.5*IQR$.

Parameters in the calculation of the upper boundary and the lower boundary are described as below. b represents the upper boundary. a represents lower boundary. Q1 represents the first quantile. Q3 represents the third quantile. IQR represents the interquartile range.

In step S203, a minimum outlier ratio of the detection dataset is calculated based on the upper boundary and the lower boundary.

The total number of outliers in the detection dataset is determined based on the upper boundary and the lower boundary. The outlier is data in the detection dataset that is smaller than the lower boundary or greater than the upper boundary.

A ratio of the total number of outliers to the total number of all pieces of data in the detection dataset is calculated as the minimum outlier ratio, that is, $\theta=\text{outlier}(d)/\text{length}(d)$. θ represents the minimum outlier ratio, outlier(d) represents the total number of outliers in the detection dataset, and length(d) represents the total number of all pieces of data in the detection dataset.

In step S204, the upper boundary, the lower boundary and the minimum outlier ratio are determined as the outlier detection parameters.

The detection dataset is processed based on the outlier detection, so that all the outlier detection parameters are extracted from the training dataset for the data processing model, so as to effectively determine whether concept drift occurs in the data processing model. The training dataset is updated, so that the outlier detection parameters are updated, so as to adapt to a variety of application scenarios. Further, the outlier detection parameters may be updated in time by downloading the data processing model in the process of processing data, facilitating accurate detection of concept drift on the data processing model.

Figure 3:
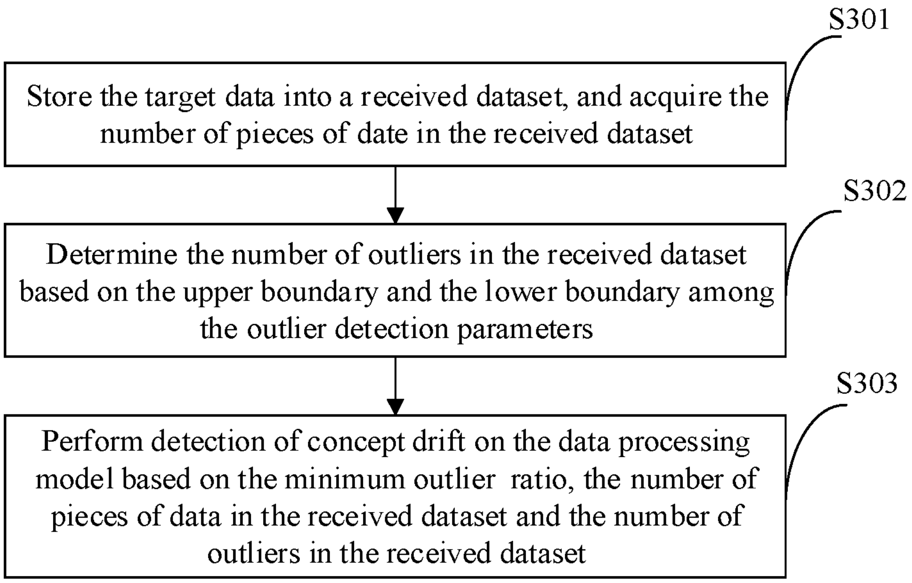
FIG. 3 is a flow chart illustrating detection of concept drift on a data processing model according to an embodiment of the present disclosure.

Reference is made to FIG. 3, which is a flow chart illustrating the detection of concept drift on the data processing model based on the target data and the outlier detection parameters according to an embodiment of the present disclosure. The detection illustrated in FIG. 3 is performed for the data outlier ratio, and is described below.

In step S301, the target data is stored into a received dataset, and the number of pieces of data in the received dataset is acquired.

The received dataset stores data read from the test data stream. After the target data is stored to the received dataset, the number of pieces of data in the received dataset is counted. The number of pieces of data in the received dataset is counted by a counter. After the target data is stored in the received dataset, a number courted by the counter is increased by one. In this way, the number of pieces of data in the received dataset after the target data is stored can be acquired.

The number of pieces of data in the received dataset is calculated from the equation sum=sum+1(init sum=0). init sum=0 represents that an initial value of sum is 0.

In step S302, the number of outliers in the received dataset is determined based on the upper boundary and the lower boundary among the outlier detection parameters.

The number of outliers in the received dataset is counted by a number counter. In a case that the target data is an outlier, a number counted by the counter is increased by one, so as to obtain the number of outliers in the received dataset. In a case that the target data is not an outlier, the number counted by the counter remains unchanged and is determined as the number of outliers in the received dataset. The number of outliers in the received dataset is counted from an equation counter=counter+1(init counter=0). init counter=0 represents that an initial value of counter is 0.

Whether the target data is an outlier is determined by determining whether the target data is smaller than the lower boundary or determining whether the target data is greater than the upper boundary. The target data that is smaller than the lower boundary or greater than the upper boundary is determined as an outlier.

Further, the outlier is data in the received dataset that is smaller than the lower boundary or greater than the upper boundary.

In step S303, the detection of concept drift is performed on the data processing model based on the minimum outlier ratio, the number of pieces of data in the received dataset and the number of outliers in the received dataset.

In the detection of concept drift on the data processing model, a ratio of the number of pieces of data in the received dataset to the number of outliers in the received dataset is calculated. It is determined whether the ratio is greater than a product of the minimum outlier ratio and a preset constant. A comparison result that the ratio is greater than the product indicates the presence of concept drift in the data processing model. A comparison result that the ratio is not greater than the product indicates the absence of concept drift in the data processing model.

The ratio of the number of pieces of data in the received dataset to the number of outliers in the received dataset is expressed as $$\frac{\text{sum}}{\text{counter}}.$$

The predefined constant is 2. The minimum outlier ratio is denoted by θ. In a case of $$\frac{\text{sum}}{\text{counter}} > 2\theta,$$

concept drift is successfully detected on the data processing model.

Figure 4:
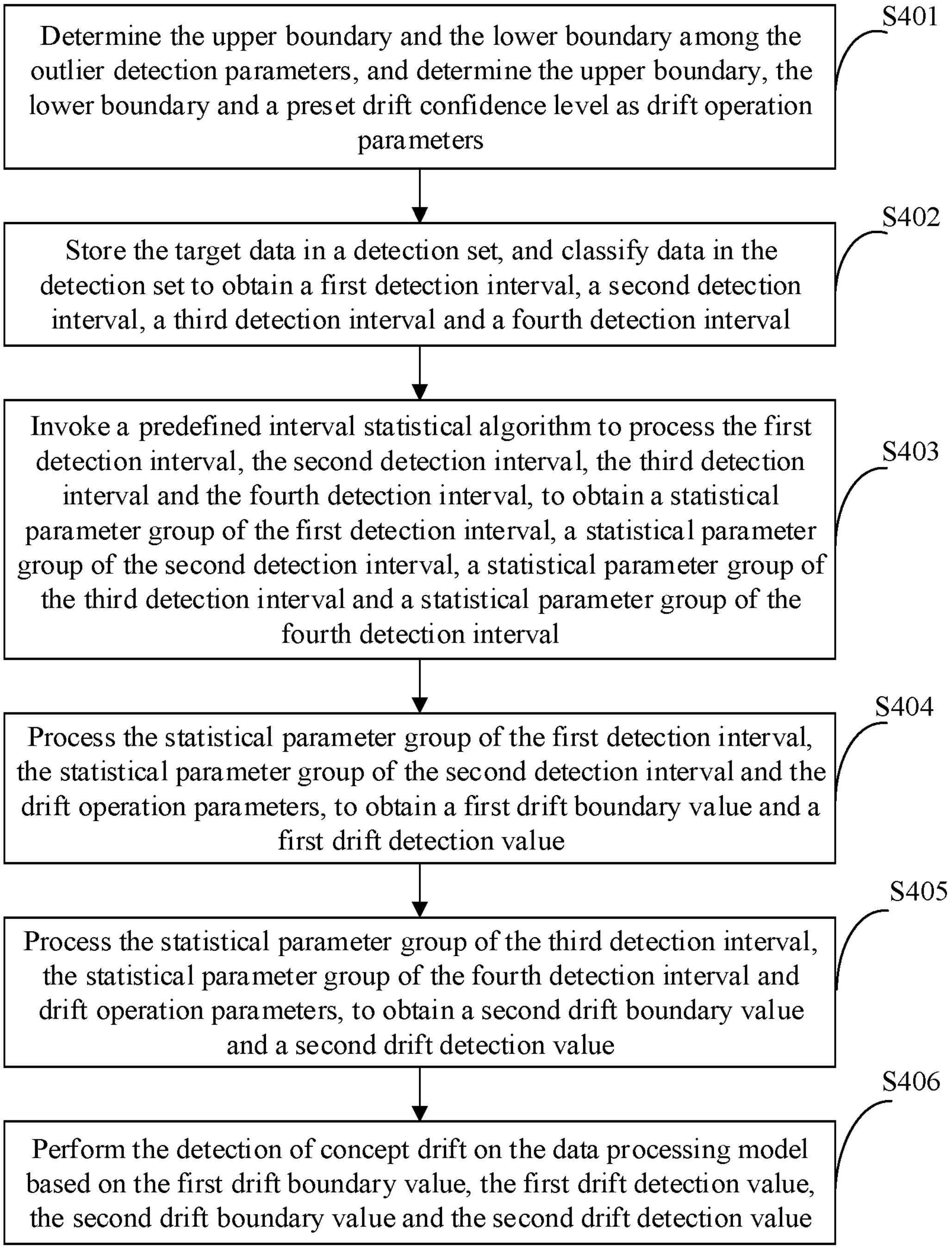
FIG. 4 is a flow chart illustrating detection of concept drift on a data processing model according to another embodiment of the present disclosure.

Reference is made to FIG. 4, which is a flow chart illustrating detection of concept drift in a data processing model according to another embodiment of the present disclosure. The detection illustrated in FIG. 4 is performed for the Hoeffding boundary and is described in detail below.

In step S401, the upper boundary and the lower boundary are determined among the outlier detection parameters. The upper boundary, the lower boundary, and a preset drift confidence level are determined as drift operation parameters.

It should be noted that the lower boundary is denoted by a, the upper boundary is denoted by b, the drift confidence level drift_level is denoted by α, and α=0.001.

In step S402, the target data is stored in a detection set, and data in the detection set is classified to obtain a first detection interval, a second detection interval, a third detection interval and a fourth detection interval.

The detection set stores the data read from the test data stream. All pieces of data in the detection set are classified to obtain the first detection interval, the second detection interval, the third detection interval and the fourth detection interval as follows. First segmentation data and second segmentation data in the detection set are determined. Data in the detection set that is stored before the first segmentation data, and the first segmentation data are determined as the first detection interval. Data in the detection set that is stored after the first segmentation data, and the first segmentation data are determined as the second detection interval. Data in the detection set that is stored before the second segmentation data, and the second segmentation data are determined as the third detection interval. Data in the detection set that is stored after the second segmentation data, and the second segmentation data are determined as the fourth detection interval.

Two pieces of segmentation data are set in the detection set, and each are an element in the detection set. The detection set is segmented based on the two pieces of segmentation data.

The detection set is denoted by $X_{total}=\{x_1, x_2, x_3, \ldots x_n\}$. $x_i$ represents the data read from the test data stream. $x_i$ may represent the target data. After the target data is stored in the detection set, $x_i$ in the detection set is $x_n$.

Figure 5:
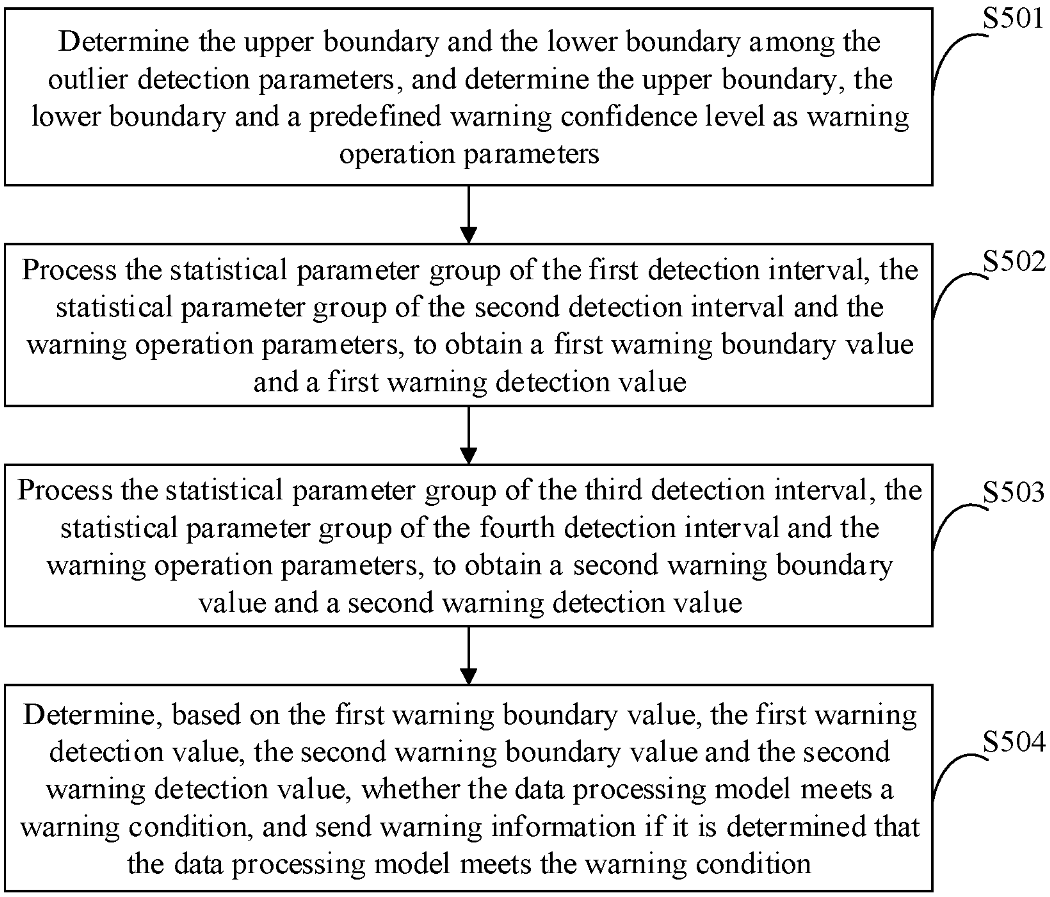
FIG. 5 is a flow chart illustrating determination of whether to send warning information according to an embodiment of the present disclosure.

The first segmentation data is represented by $x_{incre\_cut}$. The second segmentation data is represented by $x_{decre\_cut}$. Initially, there is setting of $x_{incre\_cut}=x_1$ and $x_{decre\_cut}=x_1$. The first and second segmentation data according to the embodiments of the present disclosure dynamically changes, as described in the following with reference to FIG. 5.

The first detection interval is represented by $X_{incre\_cut}=\{x_1, x_2, x_3, \ldots, x_{incre\_cut}\}$. The second detection interval is represented by $x_{n\text{-}incre\_cut}=\{x_{incre\_cut}, \ldots, x_n\}$. The third detection interval is represented by $x_{n\text{-}decre\_cut}=\{x_1, x_2, x_3, \ldots, x_{decre\_cut}\}$ The fourth detection interval is represented by $x_{n\text{-}decre\_cut}=\{x_{n\text{-}decre\_cut}, \ldots, x_n\}$.

In step S403, a predefined interval statistical algorithm is invoked to process the first detection interval, the second detection interval, the third detection interval and the fourth detection interval, to obtain a statistical parameter group of the first detection interval, a statistical parameter group of the second detection interval, a statistical parameter group of the third detection interval and a statistical parameter group of the fourth detection interval.

The statistical parameter group includes an exponentially weighted moving average EWAM(X) and a step value ε(X). The interval statistical algorithm includes the calculation of the exponentially weighted moving average EWAM and the calculation of the step value ε(X). The exponentially weighted moving average EWAM is calculated as follows.

$$EWMA(X) = \begin{cases} \lambda \cdot x_i + (1-\lambda) \cdot EWAM(X), & i > 1 \\ x_i, & i = 1 \end{cases};$$

$$\varepsilon(X) = \begin{cases} \lambda^2 + (1-\lambda)^2 \cdot \varepsilon(X), & i > 1 \\ 1, & i = 1 \end{cases}$$

λ is a predefined weight attenuation coefficient, and λ=0.05. A first piece of data of a detection interval among the first detection interval $X_{incre\_cut}=\{x_1, x_2\ x_3, \ldots, x_{incre\_cut}\}$, the second detection interval $x_{n\text{-}incre\_cut}=\{x_{incre\_cut}, \ldots, x_n\}$, the third detection interval $X_{decre\_cut}=\{x_1, x_2, x_3, \ldots, x_{decre\_cut}\}$ and the fourth detection interval $X_{n\text{-}decre\_cut}\{x_{decre\_cut}, \ldots, x_n\}$ that is currently processed by using the interval statistical algorithm is recorded as $x_1$.

The statistical parameter group of the first detection interval includes EWEA($X_{incre\_cut}$) and ε($X_{incre\_cut}$). The statistical parameter group of the second detection interval includes EWEA($X_{n\text{-}incre\_cut}$) and ε($X_{n\text{-}incre\_cut}$). The statistical parameter group of the third detection interval includes EWEA($X_{decre\_cut}$) and ε($X_{decre\_cut}$). The statistical parameter group of the fourth detection interval includes EWEA ($X_{n\text{-}decre\_cut}$) and ε($X_{n\text{-}decre\_cut}$).

In step S404, the statistical parameter group of the first detection interval, the statistical parameter group of the second detection interval and the drift operation parameters are processed to obtain a first drift boundary value and a first drift detection value.

The exponentially weighted moving average EWEA($X_{incre\_cut}$) of the first detection interval is subtracted from the exponentially weighted moving average EWEA ($X_{n\text{-}incre\_cut}$) of the second detection interval to obtain the first drift detection value, that is, the first drift detection value is equal to EWEA($X_{n\text{-}incre\_cut}$)−EWEA($X_{incre\_cut}$).

The step value ε($X_{incre\_cut}$) of the first detection interval, the step value ε($X_{n\text{-}incre\_cut}$) of the second detection interval, the lower boundary a, the upper boundary b and the drift confidence level α are substituted into a predefined drift boundary calculation equation, to obtain the first drift boundary value drift_bound ($X_{incre}$), that is, $$\text{drift\_bound}(X_{incre}) = (b-a) \cdot \sqrt{\frac{\varepsilon(X_{incre\_cut}) + \varepsilon(X_{n-incre\_cut})}{2} \ln\frac{1}{\alpha}}.$$

In step S405, the statistical parameter group of the third detection interval, the statistical parameter group of the fourth detection interval and drift operation parameters are processed, to obtain a second drift boundary value and a second drift detection value.

The exponentially weighted moving average of the fourth detection interval EWEA($X_{n\text{-}decre\_cut}$) is subtracted from the exponentially weighted moving average of the third detection interval EWEA($X_{decre\_cut}$) to obtain the second drift detection value, that is, the second drift detection value is equal to EWEA($X_{decre\_cut}$)−EWEA($X_{n\text{-}decre\_cut}$).

The step value ε($X_{decre\_cut}$) of the third detection interval, the step value ε($X_{n\text{-}decre\_cut}$) of the fourth detection interval, the lower boundary a, the upper boundary b and the drift confidence level α are substituted into the predefined drift boundary calculation equation, to obtain the second drift boundary value drift_bound($X_{decre}$), that is, $$\text{drift\_bound}(X_{decre}) = (b-a) \cdot \sqrt{\frac{\varepsilon(X_{decre\_cut}) + \varepsilon(X_{n-decre\_cut})}{2} \ln\frac{1}{\alpha}}.$$

In step S406, the detection of concept drift is performed on the data processing model based on the first drift boundary value, the first drift detection value, the second drift boundary value and the second drift detection value.

During the detection of concept drift performed on the data processing model, in a case that the first drift detection value is greater than the first drift boundary value or the second drift detection value is greater than the second drift boundary value, it is determined that the concept drift occurs in the data processing model. It should be noted that in a case that the first drift detection value is greater than the first drift boundary value, it is determined that the type of concept drift occurs in the data processing model is the type of increase. In a case that the second drift detection value is greater than the first drift boundary value, it is determined that the type of concept drift occurs in the data processing model is the type of decrease. In a case that the first drift detection value is not greater than the first drift boundary value and the second drift detection value is not greater than the second drift boundary value, it is determined no concept drift occurs in the data processing model.

In the present disclosure, the detection set is segmented into multiple detection intervals. The statistical parameter group of each detection interval is calculated. The statistical parameter groups of the detection intervals and the drift operation parameters are processed to obtain the first drift boundary value, the first drift detection value, the second drift boundary value and the second drift detection value. The detection of concept drift is performed on the data processing model based on the first drift boundary value, the first drift detection value, the second drift boundary value and the second drift detection value. Further, in response to detecting that concept drift occurs in the data processing model, the type of the concept drift detected in the data processing model is determined, so as provide basis for the subsequent retraining of the data processing model, thereby improving the performance of the data processing model.

Reference is still made to FIG. 4, the detection set is segmented and the obtained intervals are processed so as to perform the detection of concept drift on the data processing model. In another embodiment of the present disclosure, in addition to the detection of concept drift on the data processing model, it is further determined whether to send warning information as described in detail below with reference to FIG. 5.

In step S501, the upper boundary and the lower boundary are determined among the outlier detection parameters, and the upper boundary, the lower boundary and a predefined warning confidence level are determined as warning operation parameters.

The warning confidence level warning_level is presented by β, and β=0.005.

In step S502, the statistical parameter group of the first detection interval, the statistical parameter group of the second detection interval and the warning operation parameters are processed, to obtain a first warning boundary value and a first warning detection value.

The exponentially weighted moving average EWEA($X_{incre\_cut}$) of the first detection interval is subtracted from the exponentially weighted moving average EWEA ($X_{n\text{-}incre\_cut}$) of the second detection interval to obtain the first warning detection value, that is, the first warning detection value is equal to EWEA($X_{n\text{-}incre\_cut}$)−EWEA($X_{incre\_cut}$).

The step value $\varepsilon(X_{incre\_cut})$ of the first detection interval, the step value $\varepsilon(X_{n\text{-}incre\_cut})$ of the second detection interval, the lower boundary a, the upper boundary b and the warning confidence level β are substituted into a predefined warning boundary calculation equation, to obtain the first warning boundary value drift_bound($X_{incre}$), that is, $$\text{warning\_bound}(X_{incre}) = (b-a)\cdot\sqrt{\frac{\varepsilon(X_{incre\_cut})+\varepsilon(X_{n-incre\_cut})}{2}\ln\frac{1}{\beta}}.$$

In step S503, the statistical parameter group of the third detection interval, the statistical parameter group of the fourth detection interval and the warning operation parameters are processed, to obtain a second warning boundary value and a second warning detection value.

The exponentially weighted moving average of the fourth detection interval EWEA($X_{n\text{-}decre\_cut}$) is subtracted from the exponentially weighted moving average of the third detection interval EWEA($X_{decre\_cut}$) to obtain the second warning detection value, that is, the second warning detection value is equal to EWEA($X_{decre\_cut}$)−EWEA($X_{n\text{-}decre\_cut}$).

The step value $\varepsilon(X_{decre\_cut})$ of the third detection interval, the step value $\varepsilon(X_{n\text{-}decre\_cut})$ of the fourth detection interval, the lower boundary a, the upper boundary b and the warning confidence level are substituted into the predefined warning boundary calculation equation, to obtain the second warning boundary value warning bound ($X_{decre}$), that is, $$\text{warning\_bound}(X_{decre}) = (b-a)\cdot\sqrt{\frac{\varepsilon(X_{decre\_cut})+\varepsilon(X_{n-decre\_cut})}{2}\ln\frac{1}{\alpha}}.$$

In step S504, it is determined based on the first warning boundary value, the first warning detection value, the second warning boundary value and the second warning detection value whether the data processing model meets a warning condition, and warning information is sent if it is determined that the data processing model meets the warning condition.

In order to determine whether the data processing model meets the warning condition, the first warning boundary value and the first warning detection value are compared, and the second warning boundary value and the second warning detection value are compared. In a case that the first warning detection value is greater than the first warning boundary value, or the second warning detection value is greater than the second warning boundary value, it is determined that the data processing model meets the warning condition. In a case that the first warning detection value is not greater than the first warning boundary value and the second warning detection value is not greater than the second warning boundary value, it is determined that the data processing model does not meet the warning condition.

In a case that the warning information is text information, the warning information includes a determination result based on the first warning boundary value, the first warning detection value, the second warning boundary value and the second warning detection value. The warning information may be sent to a user so as to complete the warning.

Based on the determination of warning, warning information can be sent in time as needed, so as to inform the user of the current state of the data processing model.

Figure 6:
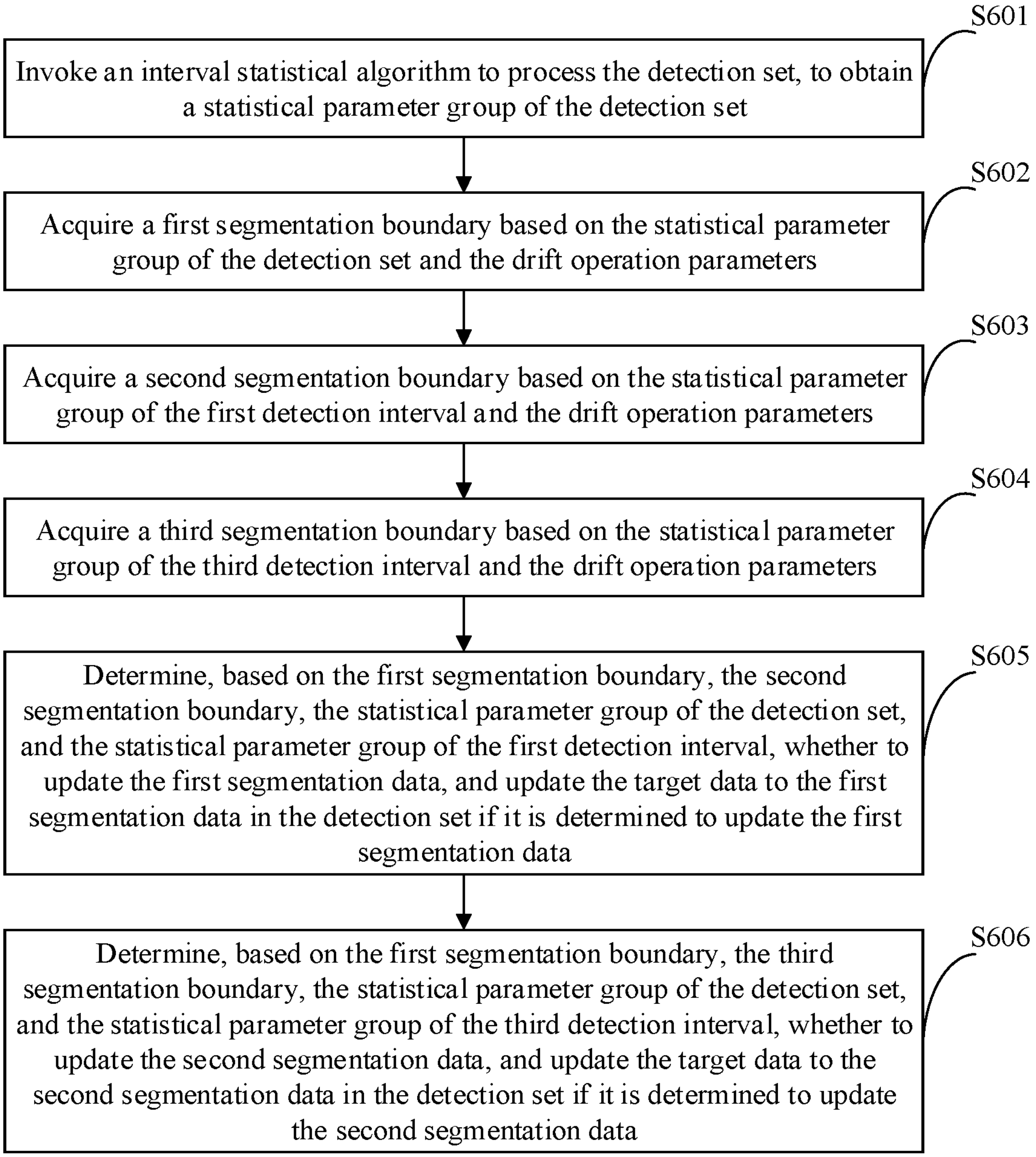
FIG. 6 is a flow chart illustrating updating of segmentation data according to an embodiment of the present disclosure.

Based on the description of FIG. 4, the first segmentation data $x_{incre\_cut}$ and the second segmentation data $x_{decre\_cut}$ in FIG. 4 are updated according to another embodiment of the present disclosure, as described in detail below with reference to FIG. 6.

In step S601, the interval statistical algorithm is invoked to process the detection set, so as to obtain a statistical parameter group of the detection set.

For the interval statistical algorithm, reference may be made to FIG. 4, and details are not repeated here.

The statistical parameter group of the detection set $X_{total}$ includes an exponentially weighted moving average EWAM ($X_{total}$) and a step value $\varepsilon(X_{total})$.

In step S602, a first segmentation boundary is acquired based on the statistical parameter group of the detection set and the drift operation parameters.

The step value of the detection set and the drift operation parameters are processed by using a predefined segmentation boundary formula, to obtain the first segmentation boundary.

The predefined segmentation boundary formula is expressed as $$bound(X) = (b-a)\cdot\sqrt{\frac{\varepsilon(X)}{2}\ln\frac{1}{\alpha}}.$$

bound(X) represents the segmentation boundary. a represents the lower boundary, b represents the upper boundary, ε(X) represents the step value, and α represents the drift confidence level.

Therefore, the first segmentation boundary is expressed as:

$$bound(X_{total}) = (b-a)\cdot\sqrt{\frac{\varepsilon(X_{total})}{2}\ln\frac{1}{\alpha}}.$$

In step S603, a second segmentation boundary is acquired based on the statistical parameter group of the first detection interval and the drift operation parameters.

The step value of the first detection interval and the drift operation parameters are processed based on the segmentation boundary operation, to obtain the second segmentation boundary. For the segmentation boundary operation, reference is made to step S502, and thus details are not repeated here. The second segmentation boundary is expressed as:

$$bound(X_{incre\_cut}) = (b-a)\cdot\sqrt{\frac{\varepsilon(X_{incre\_cut})}{2}\ln\frac{1}{\alpha}}.$$

In step S604, a third segmentation boundary is acquired based on the statistical parameter group of the third detection interval and the drift operation parameters.

The step value of the third detection interval and the drift operation parameters are processed based on the segmentation boundary operation, to obtain the third segmentation boundary. For the segmentation boundary operation, reference is made to step S502, and thus details are not repeated here. The third segmentation boundary is expressed as:

$$bound(X_{decre\_cut}) = (b-a)\cdot\sqrt{\frac{\varepsilon(X_{decre\_cut})}{2}\ln\frac{1}{\alpha}}.$$

In step S605, it is determined, based on the first segmentation boundary, the second segmentation boundary, the statistical parameter group of the detection set, and the statistical parameter group of the first detection interval, whether to update the first segmentation data. If it is determined to update the first segmentation data, the target data is updated to the first segmentation data in the detection set.

It is determined whether a sum of the EWAM($X_{total}$) of the detection set and the first segmentation boundary bound ($X_{total}$) is less than or equal to a sum of the EWEA ($X_{incre\_cut}$) of the first detection interval and the second segmentation boundary bound($X_{incre\_cut}$). In a case of negative determination, it is determined not to update the first segmentation data. The first segmentation data remains unchanged. In a case of positive determination, it is determined to update the first segmentation data. The target data is updated to the first segmentation data in the detection set, that is, $x_{incre\_cut}=x_i \cdot x_i$ represents the target data.

Further, in a case of EWAM($X_{total}$)+bound($X_{total}$)≤EWEA($X_{incre\_cut}$)+bound($X_{incre\_cut}$), there are equations of EWEA($X_{incre\_cut}$)=EWAM($X_{total}$), bound ($X_{incre\_cut}$)=bound($X_{total}$), and $x_{incre\_cut}=x_i$.

The updating of the first segmentation data is described above.

In step S606, it is determined, based on the first segmentation boundary, the third segmentation boundary, the statistical parameter group of the detection set, and the statistical parameter group of the third detection interval, whether to update the second segmentation data. If it is determined to update the second segmentation data, the target data is updated to the second segmentation data in the detection set.

It is determined whether a difference between the EWAM ($X_{total}$) of the detection set and the first segmentation boundary bound($X_{total}$) is less than or equal to a difference between the EWEA($X_{decre\_cut}$) of the third detection interval and the third segmentation boundary bound($X_{incre\_cut}$). In a case of negative determination, it is determined not to update the second segmentation data. The second segmentation data remains unchanged. In a case of positive determination, it is determined to update the second segmentation data. The target data is updated to the second segmentation data in the detection set, that is, $x_{decre\_cut}=x_i \cdot x_i$ represents the target data.

Further, in a case of EWAM($X_{total}$)−bound($X_{total}$)≤EWEA($X_{incre\_cut}$)−bound($X_{incre\_cut}$), there are equations of EWEA($X_{decre\_cut}$)=EWAM($X_{total}$), bound($X_{decre\_cut}$)=bound($X_{total}$), and $x_{decre\_cut}=x_i$.

The updating of the second segmentation data is described above.

Figure 7:
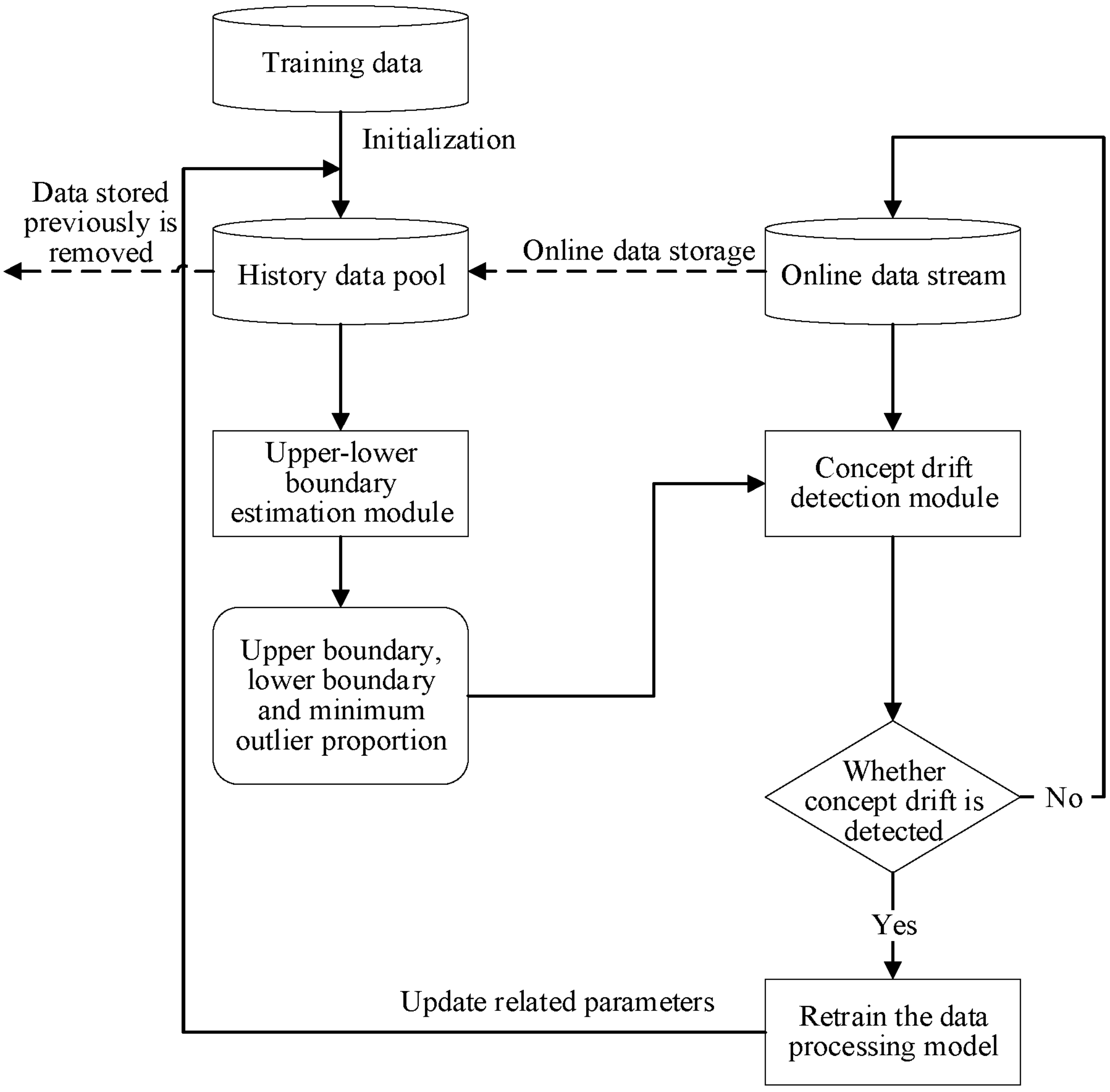
FIG. 7 is a flow chart illustrating a method for improving performance of a data processing model according to another embodiment of the present disclosure.

Reference is made to FIG. 7, which is a flow chart illustrating a method for improving performance of a data processing model according to another embodiment of the present disclosure. The embodiment illustrated in FIG. 7 is described in detail below.

The training data is stored in a historical data pool. The historical data pool is used to store historical data, including labeled data or unlabeled data. The unlabeled data, for example, data for training a model, is used to initialize the upper and lower boundaries of the detection algorithm. The data acquired from an online data stream is generally unlabeled, in order for persistent storage of online data and further for providing the basis for parameter initialization when the detection algorithm is restarted after drift. The size of the historical data pool is fixed. Only the latest buffer size pieces of data are stored, and the previously stored data is removed from the historical data pool. This is because that the storage cost increases as the amount of stored data grows. In addition, the certain amount of data stored latest is sufficient to express the features and distribution at the current time and environment.

An upper-lower boundary estimation module processes the data acquired from the historical data pool, to output the upper boundary, the lower boundary and the minimum outlier ratio. The detection module described above serves as the upper-lower boundary estimation module here. The latest n pieces of data (all training data initially) are acquired from the data pool to estimate the upper and lower boundaries of the data under the current distribution, and the proportion of outliers.

The drift detection algorithm is defined in the concept drift detection module, and includes but is not limited to the Houghtin boundary detection algorithm and the outlier ratio detection algorithm. Detection of drift is performed by using the concept drift detection algorithm based on the data obtained from the online data stream, the upper boundary, the lower boundary and the minimum outlier ratio in the upper-lower boundary estimation module. As long as no drift is detected, the detection of drift based on the data obtained from the online data stream lasts, until all the data in the online data stream is acquired already. In response to the successful detection of drift, the data processing module is retrained or the warning information is sent, and the upper-lower boundary estimation module recalculates the upper boundary, the lower boundary and the minimum outlier ratio. Then, the detection of drift based on the recalculated upper boundary, the recalculated lower boundary, the recalculated minimum outlier ratio, and the data recently acquired from the online data resumes, until all the data in the online data stream is acquired already. In view of the increasing streaming data online, the concept drift detection module performs the detection of concept drift for the Hoeffding boundary and the outlier ratio separately. The Hoeffding boundary detection algorithm is the same as HDDM-W in which the drift level is set to 0.001 and the warning level is set to 0.005 for calculating the Hoeffding boundary threshold, thereby performing the detection of drift. Since the start of the algorithm, the proportion of outliers is estimated based on the upper boundary and the lower boundary that are determined by the upper-lower boundary estimation module. In a case that the proportion of outliers exceeds a threshold, the distribution of data is considered to be strongly inconsistent and thus there may be concept drift. Processing such as drift warning and retraining of the data processing model is performed in response to successful detection of drift. Further, the upper and lower boundaries are re-estimated based on the updated data pool. Relevant variables in the detection algorithm are updated. The drift detection module is reset based on the latest upper and lower boundaries. Detection based on the online data stream resumes based on the reset drift detection module.

In the present disclosure, the determination condition based on the Hoeffding boundary is applied to the unlabeled input data, which breaks through the limitation of the Hoeffding boundary applied to an evaluation index of a model (in which real-time labels are essential). The upper and lower boundaries of the input data are approximately estimated, that is, based on the box plot, so as to satisfy the application conditions of Hoeffding's inequality and McGrady's inequality. In the detection of drift based on the Hoeffding boundary, the influence of outliers beyond the upper and lower boundaries is considered, and the proportion of outliers is determined as one of the conditions for the occurrence of drift. In the present disclosure, neither the requirement of data labels in the traditional DDM algorithm nor additional parameter artificially introduced for data selection in the detection based on statistical features is involved. Further, the influence of outliers on concept drift is considered.

An application case is described in detail below for illustration.

An electrocardiogram of 20 hours in length downloaded from Physionet serves as the raw dataset. 5000 heartbeats are randomly selected. The task is to classify heartbeats of patients with severe congestive heart failure. The dimension of the inputted data is 140. The number of categories is 5. The training dataset is 500 in size. The size of the test dataset is 4500.

(1) The multi-layer perceptron network (two-layer fully connected MLP) serves as the model, and is trained based on the training set so as to obtain the retained model. The accuracy of the model on the training set is 99.40%. Further, the model is tested based on a test set, to obtain the overall accuracy on the test set is 92.20%. It can be seen that due to concept drift, the performance of the model on the test set is greatly reduced. In order to observe the changes in the accuracy in more detail, 4500 pieces of testing data are divided into 45 data blocks (periods) each including 100 pieces of testing data according to time series. Then, testing is performed to obtain the following accuracy.

Accuracy: [1.0, 0.99, 1.0, 0.99, 1.0, 1.0, 1.0, 1.0, 0.97, 1.0, 0.99, 0.99, 0.99, 1.0, 1.0, 0.99, 1.0, 0.98, 1.0, 1.0, 0.99, 0.99, 0.99, 1.0, 0.99, 1.0, 0.88, 0.81, 0.8, 0.74, 0.87, 0.87, 0.86, 0.58, 0.61, 0.76, 0.64, 0.85, 0.96, 0.9, 0.97, 0.96, 0.92, 0.85, 0.81].

Figure 8A:
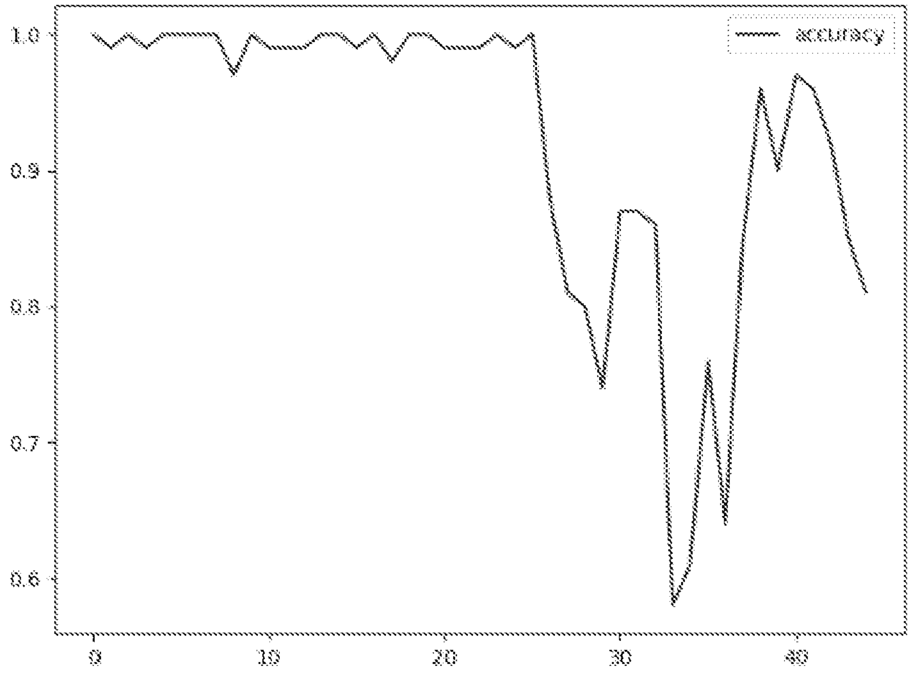
FIG. 8(*a*) is a schematic diagram illustrating an application case according to an embodiment of the present disclosure.
Figure 8B:
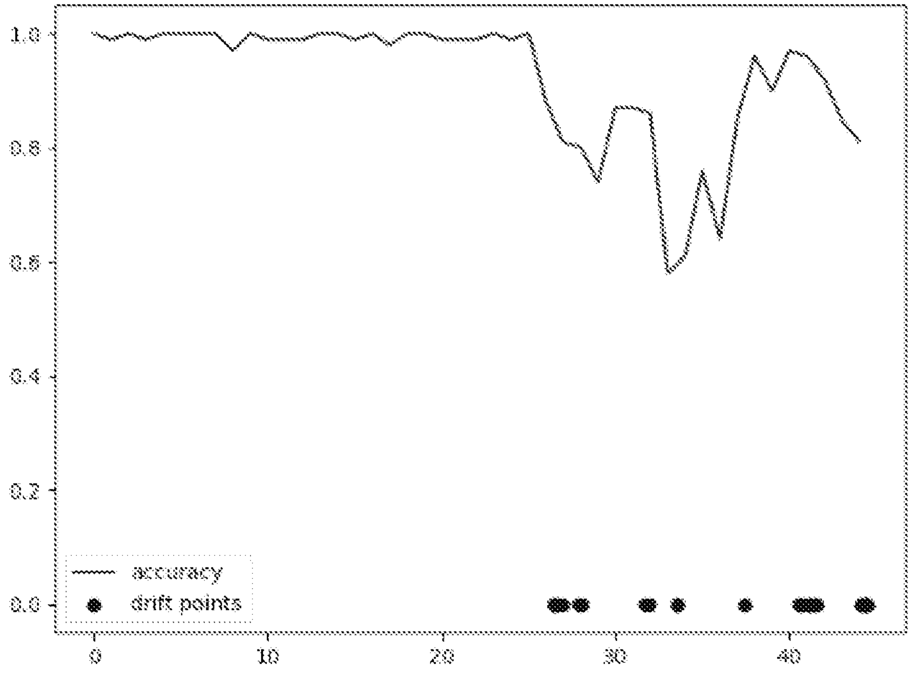
Figure 8C:
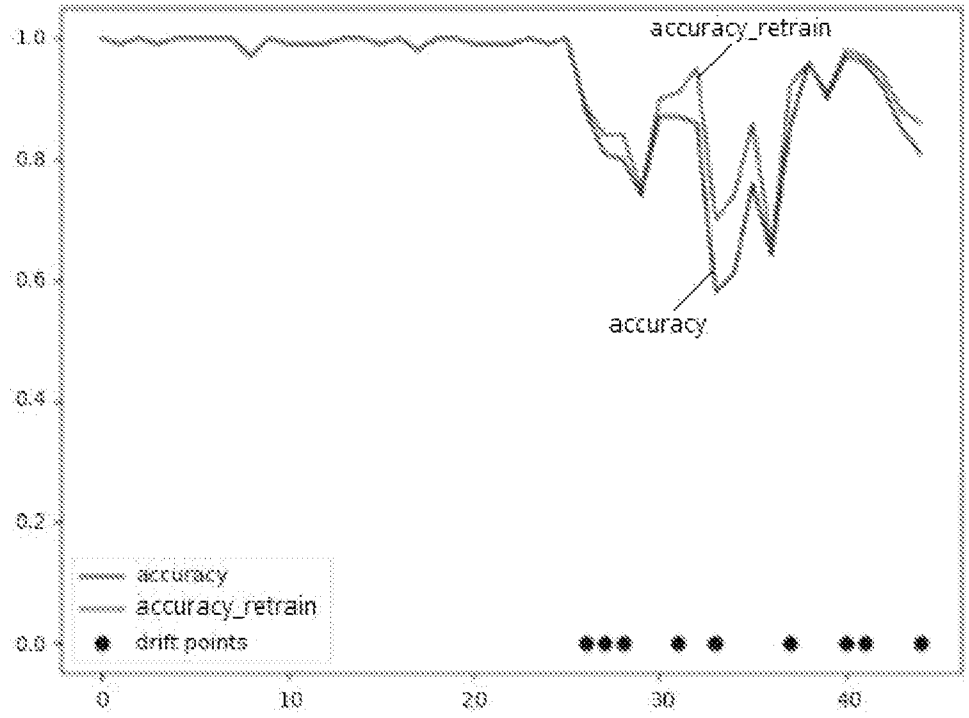

The accuracy is shown in a line graph in FIG. 8(*a*). It can be seen from FIG. 8(*a*) that concept drift begins since the 2500th data point and then results in varying degrees of impact on the accuracy of the model.

(2) In order to detect the drift without a label (that is, the accuracy cannot be calculated), detection is performed based on the Hoeffding boundary herein.

Firstly, for testing data in each dimension, the upper-lower boundary estimation module outputs the upper boundary a, the lower boundary b, and the minimum outlier ratio θ.

Secondly, the testing data serves as the data stream and is inputted into the concept drift detection module, to detect the concept drift based on the upper boundary and the lower boundary.

Finally, the detection results based on testing data in all dimensions are integrated. In a case that drift is detected in a dimension, it is considered that concept drift begins at this data point. A final drift detection result is outputted.

As shown in FIG. 8(*b*), the detected drift points are approximately consistent with the reduction in the performance (accuracy) of the model, so as to perform detection and warning for the concept drift timely and effectively in the case of no label.

(3) The model is retrained (fine-tuned) based on the detection result of concept drift, and then an improvement in the performance of the retrained model is monitored. Details are described below. The 4500 pieces of testing data are divided into 45 data blocks (periods) each including 100 pieces of testing data according to time series. Detection is performed for each of the 45 periods, to determine which of the 45 time periods has concept drift. In a case that concept drift is determined in a period t, the model is fine-tuned at in t with the data of period t−1. Subsequent detection is performed with the fine-tuned model.

Reference is made to FIG. 8(*c*), which illustrates a line graph of the accuracy of the model on the processed data after being retrained at the drift point. The accuracy of the model fine-tuned based on the detection result of concept drift is greatly improved compared with the original model. In FIG. 8(*c*), a curve denoted by accuracy illustrates the accuracy of the original model, and the curve denoted by accuracy_retrain illustrates the accuracy of the fine-tuned model. The average accuracy illustrated by the curve accuracy_retrain reaches 94.00%, and the average accuracy illustrated by the curve accuracy is 92.20%. In the 26th to 45th periods (in which concept drift exists), the average accuracy illustrated by the curve accuracy_retrain reaches 86.63%, and the average accuracy illustrated by the curve accuracy is 82.94%.

The model is retained when the concept drift is detected, so that the performance of the model is improved.

Figure 9:
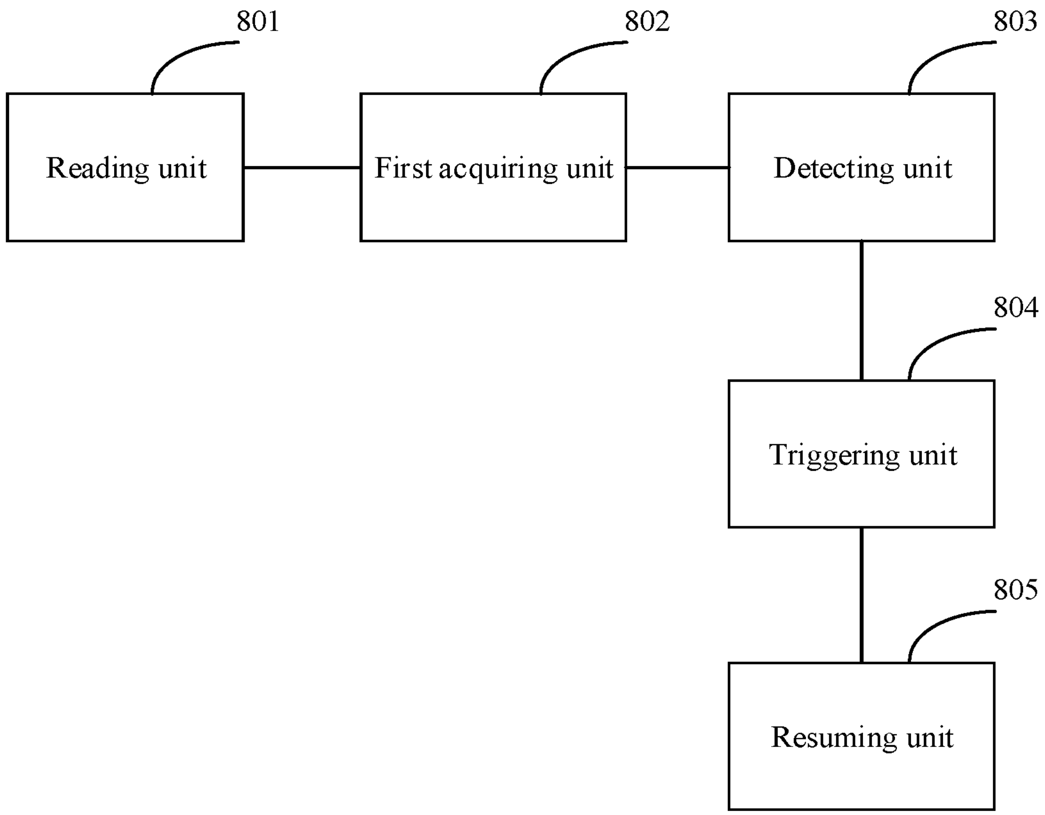
FIG. 9 is a schematic structural diagram illustrating a device for improving performance of a data processing model according to an embodiment of the present disclosure.

Corresponding to the method shown in FIG. 1, a device for improving performance of a data processing model is also provided according to the present disclosure, so as to support the implementation of the method shown in FIG. 1 in real life. The device is applied in a computer terminal. FIG. 9 is a schematic diagram illustrating structures of the device. The device includes a reading unit 801, a first acquisition unit 802, a detecting unit 803, a triggering unit 804, and a resuming unit 805.

The reading unit 801 is configured to determine a test data stream for the data processing model to read all pieces of data in the test data stream one by one, and determine a piece of data read currently as target data.

The first acquiring unit 802 is configured to acquire outlier detection parameters pre-generated in a detection module.

The detecting unit 803 is configured to perform detection of concept drift on the data processing model based on the target data and the outlier detection parameters.

The triggering unit 804 is configured to trigger, in response to detecting that concept drift occurs in the data processing model, the detection module to update each of the outlier detection parameters, and retrain the data processing model.

The resuming unit 805 is configured to, after the data processing model is already trained, determine a piece of data to be read next as the target data, acquire the updated outlier detection parameters in the detection module, and resume the detection of concept drift on the data processing model based on the target data and the updated outlier detection parameters, until all the pieces of data in the test data stream are read.

With the device according to the embodiments of the present disclosure, a test data stream for a data processing model is determined to read all pieces of data in the test data stream one by one, and a piece of data read currently is determined as target data. Outlier detection parameters in a detection module are acquired. Detection of concept drift is performed on the data processing model based on the target data and the outlier detection parameters. In response to detecting that concept drift occurs in the data processing model, the detection module is triggered to update each of the outlier detection parameters, and the data processing model is retrained. After the data processing model is already trained, a piece of data to be read next is determined as the target data, and the updated outlier detection parameters in the detection module are acquired. The detection of concept drift is resumed on the data processing model based on the target data and the updated outlier detection parameters, until all pieces of data in the test data stream are read. In the present disclosure, the data processing model is retrained when concept drift is successfully detected on the data processing model, to reduce the influence of concept drift on the data processing model and thus improve performance of the data processing model.

The device according to the embodiment of the present disclosure further includes a first determining unit, a first processing unit, an acquiring unit and a second determining unit.

The first determining unit is configured to determine a training dataset corresponding to the data processing model, and determine a detection dataset from the training dataset.

The first processing unit is configured to process the detection dataset to obtain an upper boundary and a lower boundary of the detection dataset.

The acquiring unit is configured to acquire a minimum outlier ratio of the detection dataset based on the upper boundary and the lower boundary.

The second determining unit is configured to determine the upper boundary, the lower boundary and the minimum outlier ratio as the outlier detection parameters.

In the device according to the embodiment of the present disclosure, the detecting unit 803 includes a storing subunit, a first determining subunit, and a first detecting subunit.

The storing subunit is configured to store the target data into a received dataset, and acquire the number of pieces of data in the received dataset.

The first determining subunit is configured to determine the number of outliers in the received dataset based on the upper boundary and the lower boundary among the outlier detection parameters.

The first detecting subunit is configured to perform the detection of concept drift on the data processing model based on the minimum outlier ratio, the number of pieces of data in the received dataset and the number of outliers in the received dataset.

In the device according to the embodiment of the present disclosure, the detecting unit includes a second determining subunit, a segmenting subunit, an invoking subunit, a first processing subunit, a second processing subunit, and a second detecting subunit.

The second determining subunit is configured to determine the upper boundary and the lower boundary among the outlier detection parameters, and determine the upper boundary, the lower boundary and a preset drift confidence level as drift operation parameters.

The segmenting subunit is configured to store the target data in a detection set, and classify data in the detection set to obtain a first detection interval, a second detection interval, a third detection interval and a fourth detection interval.

The invoking subunit is configured to invoke a predefined interval statistical algorithm to process the first detection interval to obtain a statistical parameter group of the first detection interval, process the second detection interval to obtain a statistical parameter group of the second detection interval, process the third detection interval to obtain a statistical parameter group of the third detection interval, and process the fourth detection interval to obtain a statistical parameter group of the fourth detection interval.

The first processing subunit is configured to process the statistical parameter group of the first detection interval, the statistical parameter group of the second detection interval and the drift operation parameters, to obtain a first drift boundary value and a first drift detection value.

The second processing subunit is configured to process the statistical parameter group of the third detection interval, the statistical parameter group of the fourth detection interval and the drift operation parameters, to obtain a second drift boundary value and a second drift detection value.

The second detecting subunit is configured to perform the detection of concept drift on the data processing model based on the first drift boundary value, the first drift detection value, the second drift boundary value and the second drift detection value.

The device according to the embodiment of the present disclosure further includes a third determining unit, a second processing unit, a third processing unit and a fourth determining unit.

The third determining unit is configured to determine the upper boundary and the lower boundary among the outlier detection parameters, and determine the upper boundary, the lower boundary and a predefined warning confidence level as warning operation parameters.

The second processing unit is configured to process the statistical parameter group of the first detection interval, the statistical parameter group of the second detection interval and the warning operation parameters, to obtain a first warning boundary value and a first warning detection value.

The third processing unit is configured to process the statistical parameter group of the third detection interval, the statistical parameter group of the fourth detection interval and the warning operation parameters, to obtain a second warning boundary value and a second warning detection value.

The fourth determining unit is configured to determine, based on the first warning boundary value, the first warning detection value, the second warning boundary value and the second warning detection value, whether the data processing model meets a warning condition, and send warning information if it is determined that the data processing model meets the warning condition.

In the device according to the embodiment of the present disclosure, the segmenting subunit includes a first determining module, a second determining module, a third determining module, and a fourth determining module.

The first determining module is configured to determine data in the detection set that is stored before the first segmentation data, and the first segmentation data as the first detection interval.

The second determining module is configured to determine data in the detection set that is stored after the first segmentation data, and the first segmentation data as the second detection interval.

The third determining module is configured to determine data in the detection set that is stored before the second segmentation data, and the second segmentation data as the third detection interval.

The fourth determining module is configured to determine data in the detection set that is stored after the second segmentation data, and the second segmentation data as the fourth detection interval.

The device according to the embodiment of the present disclosure further includes an invoking unit, a second acquiring unit, a third acquiring unit, a fourth acquiring unit, a first determining unit and a second determining unit.

The invoking unit is configured to invoke the interval statistical algorithm to process the detection set, so as to obtain a statistical parameter group of the detection set.

The second acquiring unit is configured to acquire a first segmentation boundary based on the statistical parameter group of the detection set and the drift operation parameters.

The third acquiring unit is configured to acquire a second segmentation boundary based on the statistical parameter group of the first detection interval and the drift operation parameters.

The fourth acquiring unit is configured to acquire a third segmentation boundary based on the statistical parameter group of the third detection interval and the drift operation parameters.

The first determining unit is configured to determine, based on the first segmentation boundary, the second segmentation boundary, the statistical parameter group of the detection set, and the statistical parameter group of the first detection interval, whether to update the first segmentation data, and update the target data to the first segmentation data in the detection set if it is determined to update the first segmentation data.

The second determining unit is configured to determine, based on the first segmentation boundary, the third segmentation boundary, the statistical parameter group of the detection set, and the statistical parameter group of the third detection interval, whether to update the second segmentation data, and update the target data to the second segmentation data in the detection set if it is determined to update the second segmentation data.

A storage medium is further provided according to an embodiment of the present disclosure. The storage medium stores instructions. When the instructions are executed, the device where the storage medium is located is controlled to perform the following operations: determining a test data stream for the data processing model to read all pieces of data in the test data stream one by one, and determining a piece of data read currently as target data; acquiring outlier detection parameters pre-generated in a detection module; performing detection of concept drift on the data processing model based on the target data and the outlier detection parameters; triggering, in response to detecting that concept drift occurs in the data processing model, the detection module to update each of the outlier detection parameters, and retraining the data processing model; and after the data processing model is already trained, determining a piece of data to be read next as the target data, acquiring the updated outlier detection parameters in the detection module, and resuming the detection of concept drift on the data processing model based on the target data and the updated outlier detection parameters, until all the pieces of data in the test data stream are read.

Figure 10:
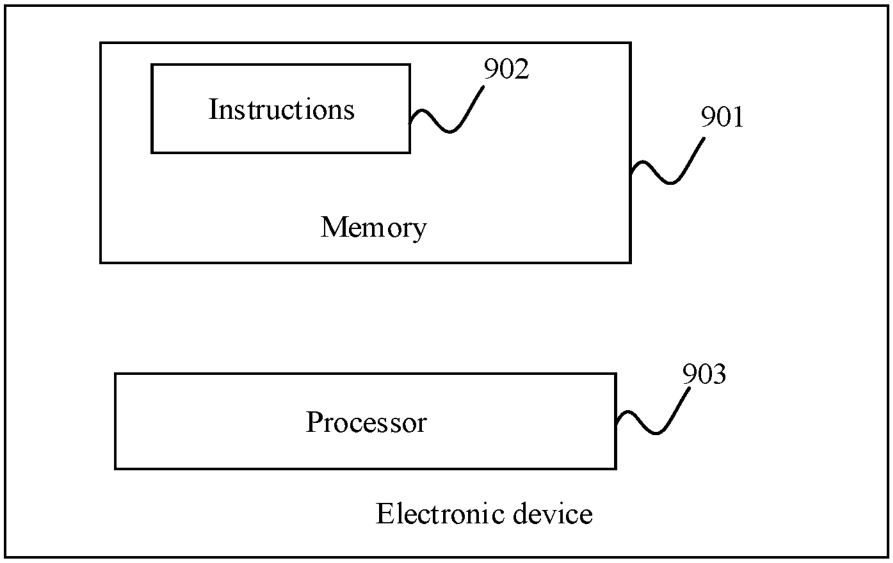
FIG. 10 is a schematic structural diagram illustrating an electronic device according to an embodiment of the present disclosure.

An electronic device is further provided according to an embodiment of the present disclosure. FIG. 10 is a schematic structural diagram of an electronic device. The electronic device includes a memory 901 and one or more processors 903. The memory 901 stores one or more instructions 902. The one or more processors 903 are configured execute the one or more instructions 902 so as to perform the following operations: determining a test data stream for the data processing model to read all pieces of data in the test data stream one by one, and determining a piece of data read currently as target data; acquiring outlier detection parameters pre-generated in a detection module; performing detection of concept drift on the data processing model based on the target data and the outlier detection parameters; triggering, in response to detecting that concept drift occurs in the data processing model, the detection module to update each of the outlier detection parameters, and retraining the data processing model; and after the data processing model is already trained, determining a piece of data to be read next as the target data, acquiring the updated outlier detection parameters in the detection module, and resuming the detection of concept drift on the data processing model based on the target data and the updated outlier detection parameters, until all the pieces of data in the test data stream are read.

The implementations of each of the embodiments and derivatives thereof are all within the protection scope of the present disclosure.

The embodiments in this specification are described in a progressive manner, the same and similar parts between embodiments may be referred to each other, and each embodiment focuses on the differences from other embodiments. Since the system or system embodiment is basically similar to the method embodiment, the description of the system or system embodiment is relatively simple, and reference may be made to part of the description of the method embodiment for related parts. The system and system embodiments described above are merely illustrative. The units described as separate parts may or may not be physically separate. Components shown as units may or may not be physical units, i.e., may be located in one place or distributed over multiple network units. Some or all of the modules may be selected as needed to achieve the purpose of the solution in this embodiment. Those skilled in the art can understand and implement the present disclosure without creative effort.

These skilled in the art should further understand that the units and algorithm steps of each example described in conjunction with the embodiments disclosed herein may be implemented in electronic hardware, computer software, or a combination of the two. In order to clearly illustrate the interchangeability of hardware and software, the components and steps of each example have been generally described in terms of functions in the foregoing description. Whether these functions are performed in hardware or software depends on the specific application and design constraints of the technical solution. For each application, these skilled in the art may implement the described function in various manners, and such implementations should not be considered beyond the scope of the present disclosure.

The disclosed embodiments are described above, so that these skilled in the art can implement or use the present disclosure. Various modifications to these embodiments are apparent to those skilled in the art. The general principles defined herein may be implemented in other embodiments without departing from the spirit or scope of the present disclosure. Therefore, the present disclosure is to be accorded the widest scope consistent with the principles and novel features disclosed herein rather than limited to the embodiments shown herein.

The invention claimed is:

1. A method for improving performance of a data processing model, comprising:

determining a test data stream for the data processing model to read all pieces of data in the test data stream one by one, and determining a piece of data read currently as target data;

acquiring outlier detection parameters pre-generated in a detection module;

performing detection of concept drift on the data processing model based on the target data and the outlier detection parameters;

triggering, in response to detecting that concept drift occurs in the data processing model, the detection module to update each of the outlier detection parameters, and retraining the data processing model;

after the data processing model is already trained, determining a piece of data to be read next as the target data, acquiring the updated outlier detection parameters in the detection module, and resuming the detection of concept drift on the data processing model based on the target data and the updated outlier detection parameters, until all the pieces of data in the test data stream are read; and processing data by using the trained data processing model after the detection of concept drift, and outputting a data processing result;

wherein the performing detection of concept drift on the data processing model based on the target data and the outlier detection parameters comprises:

storing the target data into a received dataset, and acquiring the number of pieces of data in the received dataset;

determining the number of outliers in the received dataset based on the upper boundary and the lower boundary among the outlier detection parameters; and performing the detection of concept drift on the data processing model based on the minimum outlier ratio among the outlier detection parameters, the number of pieces of data in the received dataset and the number of outliers in the received dataset.

2. The method according to claim 1, wherein generation of outlier detection parameters by the detection module comprises:

determining a training dataset corresponding to the data processing model, and determining a detection dataset from the training dataset;

processing the detection dataset to obtain an upper boundary and a lower boundary of the detection dataset;

acquiring a minimum outlier ratio of the detection dataset based on the upper boundary and the lower boundary; and determining the upper boundary, the lower boundary and the minimum outlier ratio as the outlier detection parameters.

3. The method according to claim 1, wherein the performing detection of concept drift on the data processing model based on the target data and the outlier detection parameters comprises:

determining the upper boundary and the lower boundary among the outlier detection parameters, and determining the upper boundary, the lower boundary and a preset drift confidence level as drift operation parameters;

storing the target data in a detection set, and classifying data in the detection set to obtain a first detection interval, a second detection interval, a third detection interval and a fourth detection interval;

invoking a predefined interval statistical algorithm to process the first detection interval to obtain a statistical parameter group of the first detection interval, process the second detection interval to obtain a statistical parameter group of the second detection interval, process the third detection interval to obtain a statistical parameter group of the third detection interval, and process the fourth detection interval to obtain a statistical parameter group of the fourth detection interval;

processing the statistical parameter group of the first detection interval, the statistical parameter group of the second detection interval and the drift operation parameters, to obtain a first drift boundary value and a first drift detection value;

processing the statistical parameter group of the third detection interval, the statistical parameter group of the fourth detection interval and the drift operation parameters, to obtain a second drift boundary value and a second drift detection value; and performing the detection of concept drift on the data processing model based on the first drift boundary value, the first drift detection value, the second drift boundary value and the second drift detection value.

4. The method according to claim 3, further comprising:

after the performing the detection of concept drift on the data processing model, determining the upper boundary and the lower boundary among the outlier detection parameters, and determining the upper boundary, the lower boundary and a predefined warning confidence level as warning operation parameters;

processing the statistical parameter group of the first detection interval, the statistical parameter group of the second detection interval and the warning operation parameters, to obtain a first warning boundary value and a first warning detection value;

processing the statistical parameter group of the third detection interval, the statistical parameter group of the fourth detection interval and the warning operation parameters, to obtain a second warning boundary value and a second warning detection value; and determining, based on the first warning boundary value, the first warning detection value, the second warning boundary value and the second warning detection value, whether the data processing model meets a warning condition, and sending warning information if it is determined that the data processing model meets the warning condition.

5. The method according to claim 3, wherein the classifying data in the detection set to obtain a first detection interval, a second detection interval, a third detection interval and a fourth detection interval comprises:

determining first segmentation data and second segmentation data in the detection set;

determining data in the detection set that is stored before the first segmentation data, and the first segmentation data as the first detection interval;

determining data in the detection set that is stored after the first segmentation data, and the first segmentation data as the second detection interval;

determining data in the detection set that is stored before the second segmentation data, and the second segmentation data as the third detection interval; and determining data in the detection set that is stored after the second segmentation data, and the second segmentation data as the fourth detection interval.

6. The method according to claim 5, further comprising:

after the first detection interval, the second detection interval, the third detection interval and the fourth detection interval are obtained, invoking the interval statistical algorithm to process the detection set, to obtain a statistical parameter group of the detection set;

acquiring a first segmentation boundary based on the statistical parameter group of the detection set and the drift operation parameters;

acquiring a second segmentation boundary based on the statistical parameter group of the first detection interval and the drift operation parameters;

acquiring a third segmentation boundary based on the statistical parameter group of the third detection interval and the drift operation parameters;

determining, based on the first segmentation boundary, the second segmentation boundary, the statistical parameter group of the detection set, and the statistical parameter group of the first detection interval, whether to update the first segmentation data, and updating the target data to the first segmentation data in the detection set if it is determined to update the first segmentation data; and determining, based on the first segmentation boundary, the third segmentation boundary, the statistical parameter group of the detection set, and the statistical parameter group of the third detection interval, whether to update the second segmentation data, and updating the target data to the second segmentation data in the detection set if it is determined to update the second segmentation data.

7. A non-transitory storage medium, wherein the non-transitory storage medium stores instructions that, when being executed, control a device where the storage medium is arranged to perform the method for improving performance of a data processing model according to claim 1.

8. An electronic device, comprising:

a memory configured to store one or more instructions; and one or more processors configured to execute the one or more instructions so as to perform the method for improving performance of a data processing model according to claim 1.

9. A device for improving performance of a data processing model, comprising:

a reading unit configured to determine a test data stream for the data processing model to read all pieces of data in the test data stream one by one, and determine a piece of data read currently as target data;

a first acquiring unit configured to acquire outlier detection parameters pre-generated in a detection module;

a detecting unit configured to perform detection of concept drift on the data processing model based on the target data and the outlier detection parameters;

a triggering unit configured to trigger, in response to detecting that concept drift occurs in the data processing model, the detection module to update each of the outlier detection parameters, and retrain the data processing model;

a resuming unit configured to, after the data processing model is already trained, determine a piece of data to be read next as the target data, acquire the updated outlier detection parameters in the detection module, and resume the detection of concept drift on the data processing model based on the target data and the updated outlier detection parameters, until all the pieces of data in the test data stream are read; and a processing unit configured to process data by using the trained data processing model after the detection of concept drift, and output a data processing result;

wherein the a detecting unit is further configured to perform detection of concept drift on the data processing model based on the target data and the outlier detection parameters by:

storing the target data into a received dataset, and acquiring the number of pieces of data in the received dataset;

determining the number of outliers in the received dataset based on the upper boundary and the lower boundary among the outlier detection parameters; and performing the detection of concept drift on the data processing model based on the minimum outlier ratio among the outlier detection parameters, the number of pieces of data in the received dataset and the number of outliers in the received dataset.

* * * * *